J. S. SHAFFER.
SEED PLANTER.
APPLICATION FILED AUG. 20, 1917.

1,299,626.

Patented Apr. 8, 1919.
2 SHEETS—SHEET 1.

INVENTOR
J. S. Shaffer
BY
George F. Thorpe
ATTORNEY

J. S. SHAFFER.
SEED PLANTER.
APPLICATION FILED AUG. 20, 1917.
1,299,626.
Patented Apr. 8, 1919.
2 SHEETS—SHEET 2.
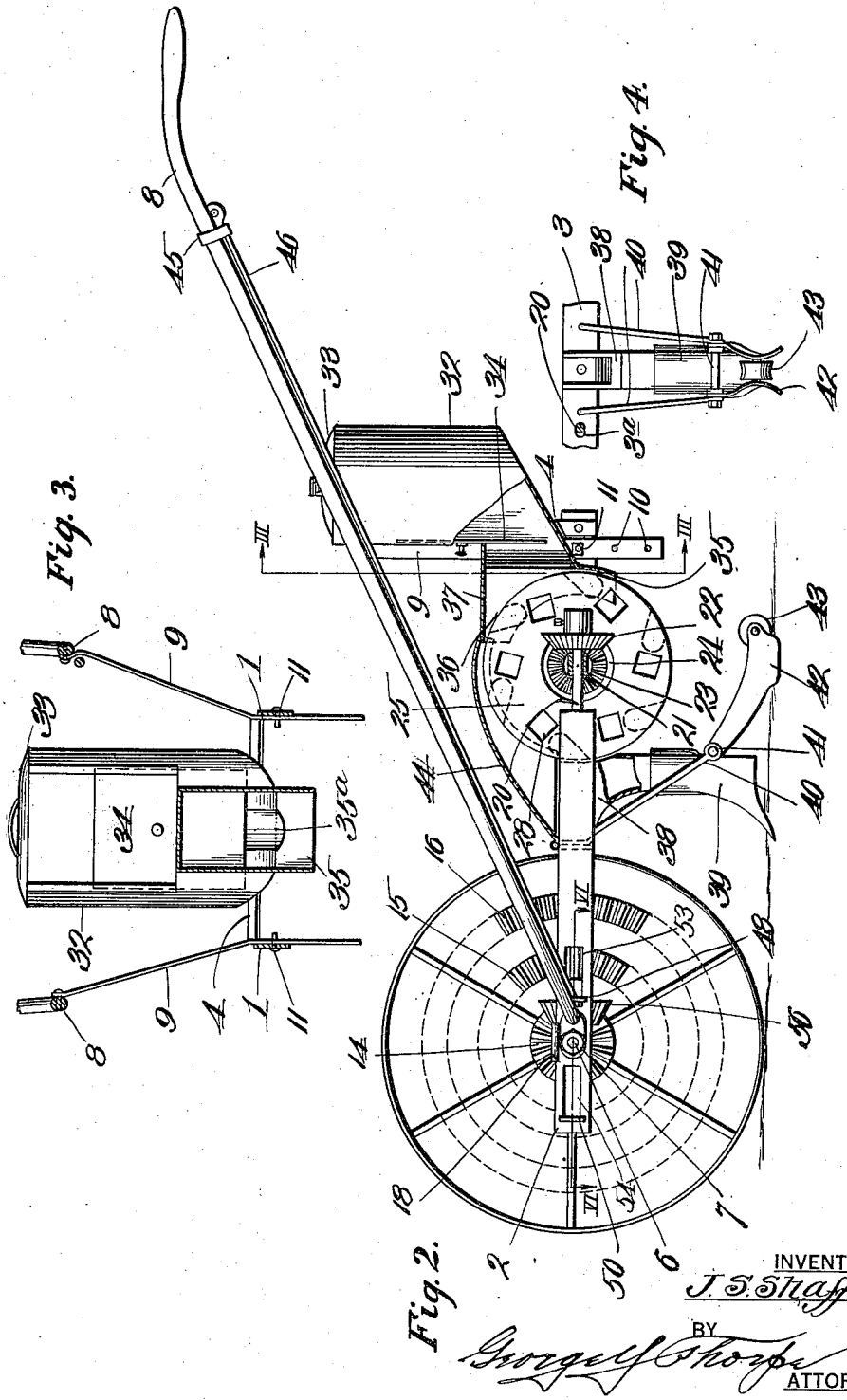
INVENTOR
J. S. Shaffer
BY
George H. Thorpe
ATTORNEY

UNITED STATES PATENT OFFICE.

JOSEPH S. SHAFFER, OF INDEPENDENCE, MISSOURI.

SEED-PLANTER.

1,299,626.   Specification of Letters Patent.   Patented Apr. 8, 1919.

Application filed August 20, 1917. Serial No. 187,262.

*To all whom it may concern:*

Be it known that I, JOSEPH S. SHAFFER, a subject of the Emperor of Austria, and a resident of Independence, in the county of Jackson and State of Missouri, have invented certain new and useful Improvements in Seed-Planters, of which the following is a specification.

This invention relates to a machine for planting seeds, onion sets, and the like and has for its object to produce a machine for accurately planting at equi-distant spaces and adaptable for varying the spacing and, if desired, the depth of planting of the seed.

More specifically my object is to produce a machine by which the variation of the spacing can be accomplished by changing the speed of operation of the dropping mechanism or varying the number of seed pockets used by plugging or unplugging one or more of the seed-dropping pockets. A still further object is to produce a simple, strong, durable, compact and inexpensive machine which can be handled by a single operator.

With these general objects in view the invention consists in certain novel and peculiar features of construction and organization of parts as hereinafter described and claimed, and in order that the invention may be fully understood reference is to be had to the accompanying drawings, in which:

Fig. 2, is a side view with parts broken away and certain parts in section.

Fig. 3, is a vertical section on the line III—III of Fig. 2.

Fig. 4, is a fragmentary view to more clearly show the connection between the shoe and the frame of the machine.

Figure 1:
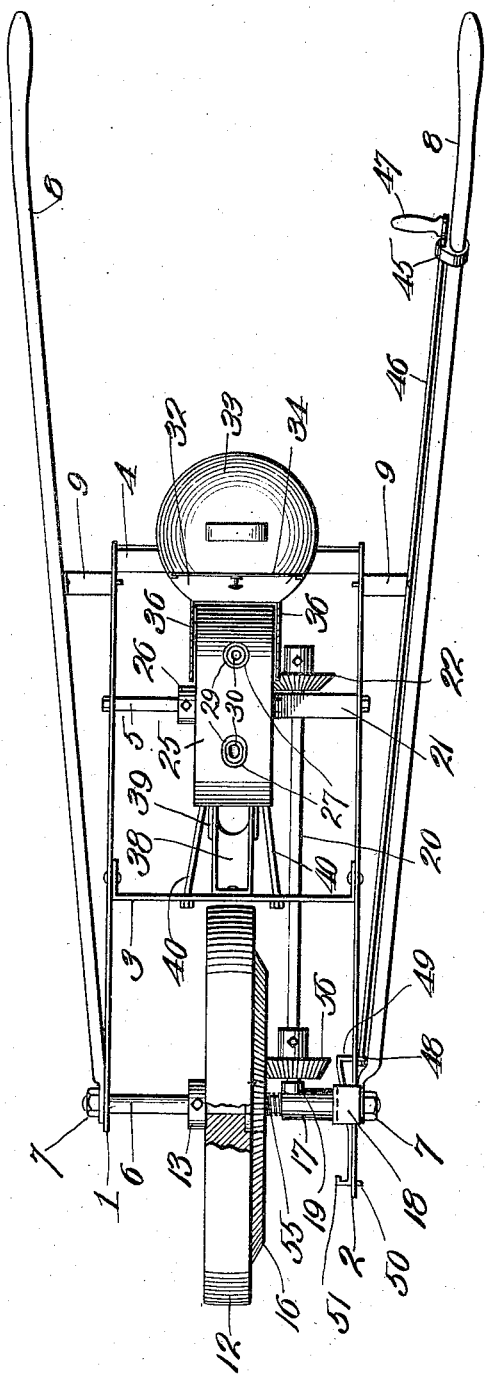
Figure 1, is a broken plan view of a machine embodying the invention.

In the said drawings, a frame comprises a pair of side bars 1—2, connected by a cross bar 3 and an inclined cross bar 4, and transverse shafts 5 and 6 are secured to the side bars of said frame, clamping nuts 7 engaging the opposite ends of shaft 6, clamp firmly against the sides of said frame, a pair of inclined and rearwardly diverging handles 8. A pair of braces 9 are secured at their upper ends to said handles, and at their lower ends are provided with a vertical series of perforations 10 through certain of which bolts 11 extend to secure the braces to said frame near the rear end thereof.

A ground wheel 12 is journaled on shaft 6 between a pair of collars 13 upon said shaft, and is provided with beveled gears 14, 15 and 16 arranged concentrically with respect to the axis of the wheel. At one side of said wheel a sleeve 17 is slidingly mounted on shaft 6 and terminates at its outer end in an upwardly projecting hook 18, the terminal of the hook being adapted by engagement with side bar 2, to limit inward movement of the sliding sleeve. At its inner end said sleeve is provided with a rearwardly projecting bearing socket 19 wherein is journaled the front end of a shaft 20 extending longitudinally of the machine. The shaft extends through a short slot 3ᵃ in cross bar 3, and is loosely journaled near its rear end in an enlargement 21 of shaft 5. A beveled gear 22 is secured on the rear end of said shaft 20 and meshes with a beveled gear 23 occupying a recess 24 in the adjacent face of a seed-dropping wheel 25 journaled on shaft 5 between the enlargement 21 thereof and a collar 26 thereon.

Figure 5:
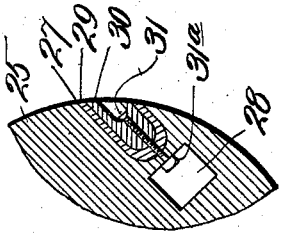
Fig. 5, is an enlarged fragmentary section of the seed-dropping wheel.

The wheel is provided with a series of peripheral pockets 27 and a corresponding series of openings 28. The pockets are adapted for receiving charges of seed or grain, or for receiving onion sets, one of which is ordinarily a full charge for one of the pockets. For small grain or seed the capacity of each pocket can be diminished by fitting a cup lining 29 in the pockets, and for very fine seed, an additional cup lining 30 may be fitted within the cup lining 29, and said linings can be secured in position by bolts 31 extending through them and the wheel into the adjacent openings 28, and engaging the ends of the bolts by retaining nuts 31ᵃ as shown by Fig. 5.

Arranged rearward of the seed-dropping wheel is a seed hopper 32 provided with a removable top 33 and with a slide valve 34, the latter being adjustable toward and from the downwardly and forwardly inclined bottom of the hopper, which bottom terminates in close proximity to the periphery of the seed-dropping wheel and is provided with a depending lip 35 paralleling the periphery of the wheel sufficiently to completely cover the pockets and thus prevent any chance of seed escaping from the pockets without first passing through the drill shoe, hereinafter described, and in order to insure the charging of the pockets as they successively come into communication with the hopper, the inclined or sloping bottom of the latter is provided with a channel 35ª tending to direct onion sets particularly, into the successively presented pockets of the wheel.

The said hopper forward of the valve is provided with side extensions 36 closely embracing opposite sides of the seed-dropping wheel, and with a top 37 for preventing the dislodgment of seed from the hopper in the event that the valve is open far enough to permit a considerable quantity of seed to enter the space forward of the valve.

Arranged forward of the seed-dropping wheel is a shoe comprising an upper or leg portion 38 and a lower shoe portion 39 fitting telescopically on the leg to permit of adjustment for varying the depth of planting. A pair of inclined brace rods 40 are secured at their upper ends to cross bar 3 to which the shoe is also secured, and the lower ends of said rods are secured to a cross bolt 41 carried by the shoe and forming a support for a covering runner 42 and a packing roller 43, these features being common in seed planters. The upper end of the drill shoe is closed by a cover 44, and the same extends over the wheel to the extension of the hopper and guards against loss of grain through jolting thereof from the pockets as the machine travels over a field.

Figure 6:
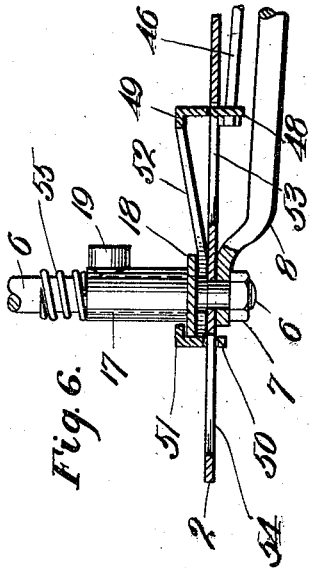
Fig. 6, is an enlarged section taken substantially on the line VI—VI of Fig. 2.

Secured on one of the handles 8 is a collar 45 and extending slidingly therethrough is a rod 46 provided at its rear end with a handle 47. At its front end the rod 46 is secured to a lug 48 projecting outwardly from the rear end of a slidable wedge 49, the front end of said wedge having a headed lug 50 and a rearwardly projecting hook 51, the latter when the wedge is in its withdrawn or inoperative position, as shown by Fig. 6, overlapping the inner side of the hook 18 of sleeve 17 to hold the latter in its outermost position of adjustment, it being noticed that the wedge is provided with a longitudinal slot 52 through which extends the shaft 6 so that the wedge may be adjusted without interference on the part of said shaft, and that the side 2 of the frame is provided with slots 53 and 54 through which said lugs 48 and 50 extend and operate when the slidable wedge is moved forward or rearward. When it moves forward it forces the slidable sleeve 17 inward against the resistance of a spring 55 interposed between it and the adjacent collar 13, and said spring imparts reverse movement to the sliding sleeve when the wedge is drawn rearwardly by the application of a rearward pull on the handle 47.

When the handle is pushed forward, the wedge is advanced and moves the sleeve inward until arrested through the engagement of its hook portion 18 with the outer side of side bar 2. In this movement the shaft 20 is slightly pivotally operated for the purpose of causing a gear wheel 56 secured upon it, to engage one of the gear wheels 14, 15 or 16 as the case may be of the supporting wheel 12, it being understood that the wheel 56 is adjusted on shaft 20 to accommodate the diameter of the particular gear wheel mentioned with which it is desired to establish operative relationship, it being obvious that when the gear wheel 56 engages gear wheel 14, the seed-dropping wheel will be driven at the minimum speed and hence the seed discharged from the pockets into the shoe 38, will be spaced a greater distance apart than when the seed-dropping wheel is driven more rapidly through the engagement of gear wheel 56 with gear wheel 15 or gear wheel 16, the engagement with the last-named wheel of course giving maximum speed of rotation to the said driving wheel. If desired one or more of the lining cups for the pockets may be plugged to prevent entrance of seed therein, and in consequence there will be fewer discharges of seed into the shoe and a correspondingly wider spacing of the planted seed. It will thus be seen that the spacing of the planting can be varied either through an adjustment of the beveled gear 56 or the plugging or unplugging of one or more of the cups of the seed-dropping wheel.

As the function of the various parts has been set forth in detail, it is only desirable to state that the machine is intended primarily to be propelled by a person pushing upon the handles, though it is obvious that the machine may be drawn by draft animals or other power.

From the above description it will be apparent that I have produced a device of the character described which possesses the features of advantage enumerated, and while I have illustrated and described what now appears to be the preferred embodiment of the invention, it is to be understood that I reserve the right to all changes properly falling within the spirit and scope of the appended claim.

I claim:

In a seed planter, the combination of a suitable frame, transverse shafts mounted therein, wheels upon said shafts, a sleeve upon one of said shafts, a spring tending to force said sleeve away from the adjacent wheel, a shaft journaled at one end in said sleeve and at the other at a fixed point in the frame, a gear wheel on each end of the shaft, the gear wheel adjacent the said fixed point in the frame being permanently intergeared with one of said first-named wheels, a wedge normally guarding against accidental movement of the sleeve in opposition to the spring, and means for sliding the wedge to release and then force the sleeve in opposition to said spring, to dispose the gear-wheel-carrying shaft in operative relation to the other of the first-named wheels.

In testimony whereof, I affix my signature.

JOSEPH S. SHAFFER.

Copies of this patent may be obtained for five cents each, by addressing the "Commissioner of Patents, Washington, D. C."